United States Patent [19]

Yanagisawa

[11] Patent Number: 4,696,845
[45] Date of Patent: Sep. 29, 1987

[54] MAGNETIC STORAGE MEDIUM WITH LUBRICATING COATING

[75] Inventor: Masahiro Yanagisawa, Tokyo, Japan

[73] Assignee: NEC Corporation, Tokyo, Japan

[21] Appl. No.: 768,834

[22] Filed: Aug. 23, 1985

[30] Foreign Application Priority Data

Aug. 27, 1984 [JP] Japan ............................... 59-177949
Oct. 22, 1984 [JP] Japan ............................... 59-221729
Oct. 22, 1984 [JP] Japan ............................... 59-221730

[51] Int. Cl.$^4$ ............................................. G11B 5/71
[52] U.S. Cl. ....................................... 428/64; 427/128;
427/131; 427/132; 428/65; 428/421; 428/422;
428/694; 428/695; 428/900
[58] Field of Search ............... 428/694, 695, 422, 421,
428/407, 900, 425.9, 64, 65; 427/131, 128, 132;
252/62.54

[56] References Cited

U.S. PATENT DOCUMENTS

| 3,778,308 | 12/1973 | Roller | 428/421 |
|---|---|---|---|
| 4,268,556 | 5/1981 | Pedrotty | 428/695 |
| 4,327,139 | 4/1982 | Schaefer | 428/695 |
| 4,368,239 | 1/1983 | Nakajima | 428/421 |
| 4,404,247 | 9/1983 | Dominguez-Burguette | 427/131 |
| 4,505,990 | 3/1985 | Dasgupta | 428/692 |
| 4,526,833 | 7/1985 | Burguette | 427/131 |
| 4,529,659 | 7/1985 | Hoshino | 428/450 |
| 4,536,444 | 8/1985 | Sumiya | 428/695 |
| 4,583,145 | 4/1986 | Mönnich | 427/131 |

Primary Examiner—Ellis P. Robinson
Attorney, Agent, or Firm—Burns, Doane, Swecker & Mathis

[57] ABSTRACT

The disclosure relates to a lubricant layer formed on the magnetic surface of a magnetic storage medium such as a magnetic disk. Optionally a protective film may be interposed between the magnetic surface and the lubricant layer. Several types of perfluoroalkyl compounds including some polymers have been proved excellent as the lubricating material. The lubricant layer formed of these perfluoroalkyl compounds is remarkably high in durability even though the read/write head makes repeated frictional contact with the storage medium, and this lubricant layer is very low in the tendency to stick to the head.

28 Claims, 2 Drawing Figures

MAGNETIC STORAGE MEDIUM WITH LUBRICATING COATING

BACKGROUND OF THE INVENTION

This invention relates to a magnetic storage medium for use in a magnetic storage or memory such as a magnetic disk unit or a magnetic drum unit.

In magnetic storage means having a read/write head (hereinafter simply called a head) and a movable magnetic storage medium represented by a magnetic disk, a prevailing mode of reading and writing information is the so-called contact-start-stop (CSS) method. According to this method, the head is in contact with the magnetic surface of the storage medium at the start of a read or write operation. Starting the operation the magnetic storage medium is driven to turn at a given rate and to provide a narrow spacing or air bearing between the head and the magnetic surface of the storage medium, and in that state the operation is conducted. At the end of the operation the storage medium stops turning and again comes into contact with the head which is held under a predetermined load. Therefore, friction force acts on both the head and the storage medium so that the head and/or the storage medium undergo gradual wear, which sometimes results in scratching of the head and/or the storage medium. Besides, in some cases a slight change in the orientation of the head in the friction contact state becomes a cause of uneven distribution of the load on the head and, consequently, scratching of the head and/or the storage medium. As another problem, the head and the magnetic storage medium tend to stick to each other when long left in contact with each other and, then, they do not smoothly part from each other at the start of a read or write operation.

To protect the magnetic storage medium from being scratched or otherwise damaged and also to prevent it from sticking to the head, it is usual to provide a lubricating coating on the magnetic surface of the storage medium. For this purpose various kinds of lubricative materials have been proposed. For example, Japanese patent application provisional publication No. 52-49805 (1977) shows several kinds of side-chain and straight-chain perfluoroalkyl polyethers represented by the following formulas.

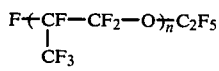

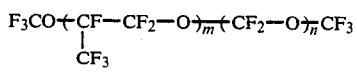

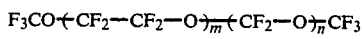

However, the lubricants thus far proposed are not yet fully satisfactory because the lubricant layer formed of any of such lubricants is gradually removed as the CSS operation is repeated many times and fails to prevent scratching of the magnetic storage medium while it is desired to further repeat CSS operations on that storage medium. Besides, the removed lubricant tends to locally accumulate on the sliding contact surface to a undesirably large thickness, and this phenomenon becomes a cause of sticking of the magnetic storage medium to the head.

SUMMARY OF THE INVENTION

It is an object of the present invention to provide a magnetic storage medium having a lubricating coating layer which adheres closely and firmly to the magnetic surface and is excellent in both lubricating ability and durability and, furthermore, ensures a good floating characteristics of the storage means with little tendency toward sticking to the head.

A magnetic storage medium according to the invention comprises a layer of a ferromagnetic material coated on a base and a lubricant layer formed on the outer side of the ferromagnetic material layer. The lubricant layer may be a direct coating on the surface of the ferromagnetic material layer. It is optional to first coat the ferromagnetic material layer with a protective film in a known manner, and in such a case the lubricant layer is formed on the surface of the protective film. In either case the principal material of the lubricant layer is selected from several groups of perfluoroalkyl compounds which I have found to be far more favorable than the aforementioned perfluoroalkyl polyethers.

The first group of perfluoroalkyl compounds useful for the lubricant layer according to the invention are represented by the general formula (1):

   (1)

wherein Rf represent $C_mF_{2m+1}$ (m is a positive integer), n is an integer not smaller than 5, J and J' each represents

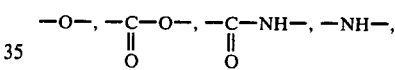

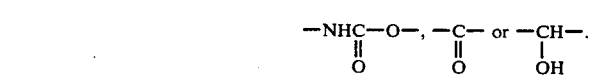

The second group of perfluoroalkyl compounds useful in this invention are akin to the compounds of the first group exact for the presence of a functional group at one or each terminal. That is, the compounds of the second group are represented by the general formulas (2A) to (2C):

   (2A)

   (2B)

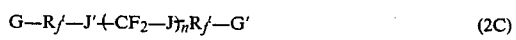   (2C)

wherein $R_f$ is as defined above, $R_f'$ represents $C_mF_{2m}$ (m is a positive integer), J and J' are defined above, n is a positive integer not smaller than 10, G and G' each represent a functional group selected from —NCO, —SH, —SO₃H, —SO₃M (M represents Na, K or Li), —CN, —NCS, —NO₂,

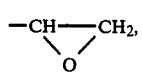

—CONH₂, —I, —COOH, —COOC$_j$H$_{2j+1}$ (j is an integer), —C$_i$H$_{2i}$OH (i is 0 or a positive integer), NH₂, —CH=CH₂, —Si(C$_h$H$_{2h+1}$)$_g$X$_{3-g}$ (h is a positive integer, g is 0, 1 or 2, X represents Cl, —OH, —OC$_f$H$_{2f+1}$ (f is a positive integer) or —A—Si(C$_h$H$_{2h+1}$)$_g$X$_{3-g}$ (h, g and X are as defined above, A is a radical consisting of at least one element selected from C, H, N, O and S). For example, the radical represented by A is —CO—NH—CH$_2$—CH$_2$—, —NH—CH$_2$—CH(OH)—CH$_2$—CH$_2$—, —NH—CO—CH$_2$—CH$_2$—, —O—CH$_2$—CH$_2$—, —S—CH$_2$—CH$_2$—,

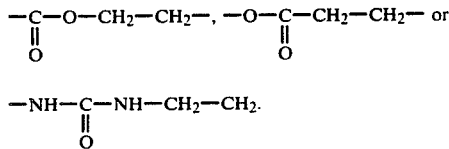

In the above general formulas, J' may be omitted.

As any of these perfluoroalkyl compounds is attracted by and adheres to either the ferromagnetic material layer or the protective film owing to the polar nature of —J— in the repeating unit —CF$_2$—J—. This repeating unit —CF$_2$—J— is stronger in affinity for the ferromagnetic material layer or the protective film than ¬(CF—CF$_2$—O)— and ¬(CF$_2$—CF$_2$—O)(CF$_2$—O)— in the hitherto proposed perfluoroalkyl compounds. The perfluoroalkyl compounds of the second group are preferable to the compounds of the first group since the functional group G provides a very strong bond between the lubricant layer and the underlying layer so that the lubricant layer is not easily removed by rubbing contact with the read/write head. Among the above listed functional groups, silanes represented by —Si(C$_h$H$_{2h+1}$)$_g$X$_{3-g}$ are most effective.

The third group of perfluoroalkyl compounds useful in this invention are represented by the general formulas (3A) to (3C):

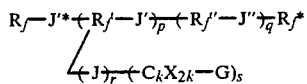 (3A)

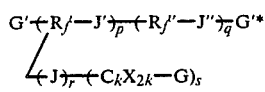 (3B)

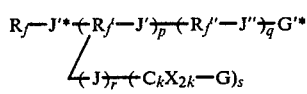 (3C)

wherein R$_f$ and R$_f$* each represent C$_m$F$_{2m+1}$ (m is a positive integer), R$_f'$ represents a radical consisting of carbon and fluorine atoms, R$_f''$ represents —C$_m$F$_{2m}$— (m is a positive integer), X represents H, F, Cl or Br, J, J', J'', J'* each represent one of

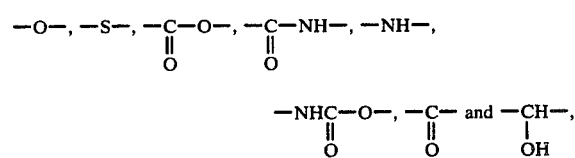

or a combination of two or more of these radical, G, G', G'* each represent a functional group selected from the ones named with respect to G, G' in the general formulas (2A) to (2C), p is a positive integer, q is 0 or a positive integer, r is 0 or 1, k is 0 or a positive integer, s is a positive integer. In the above formulas, J'* may be omitted.

For example, R$_f'$ in the general formulas (3A) to (3C) represents

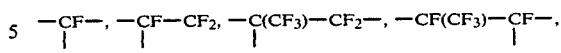

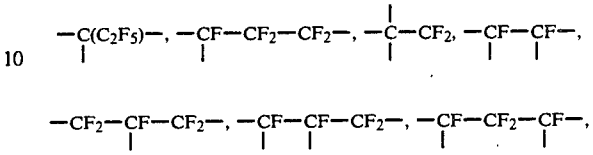

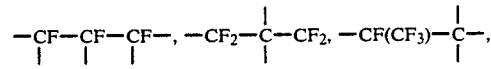

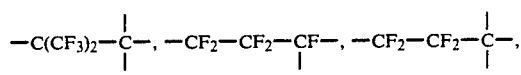

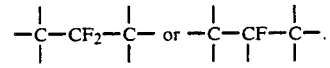

For example R$_f''$ (i.e. —C$_m$F$_{2m}$—) in the general formulas (3A) to (3C) is

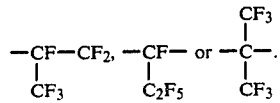

In the compounds of the general formulas (3A) to (3C), the unit including the functional group G may branch from any position of the carbon chain of R$_f'$ and may branch from any number of carbon atoms in R$_f'$.

The perfluoroalkyl compounds of the third group have at least one functional group and, therefore, strongly adhere to either the ferromagnetic material layer or the protective film similarly to the compounds of the second group. The functional group G existing in the repeating unit is more effective than the functional group G' and G'* at the terminal(s) in respect of bonding of a coating layer of the perfluoroalkyl compound to the coated surface.

The fourth of perfluoroalkyl compounds useful in this invention are represented by the general formulas (4A) to (4B):

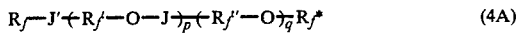 (4A)

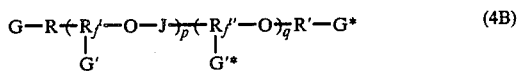 (4B)

wherein R$_f$, R$_f$* each represent C$_m$F$_{2m+1}$ (m is 0 or positive integer), R$_f'$, R$_f''$ each represent a radical consisting of carbon and fluorine atoms, J, J' each represent one of —S—,

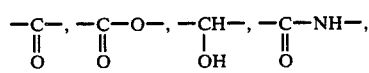

—N—, —NH—CO—, —NHCO—NH— and —NH-COO—, or a combination of two or more of these radicals, G, G', G* each represent a functional group selected from the ones named with respect to G, G' in the generals (2A) to (2C), R, R' each represent $C_wX_{2w+2}$ (X represents H, F, Cl, Br or I, w is 0 or a positive integer), p is a positive integer, q is 0 or a positive integer. In the general formula (4B) is suffices that at least one of G, G', G'* and G* exists.

For example, $R_f'$ and $R_f''$ in the formulas (4A) and (4B) each represent

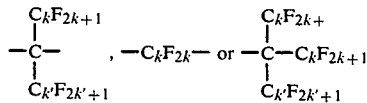

wherein k is a positive integer, k' is 0 or a positive integer.

The fifth group of perfluoroalkyl compounds useful in this invention are represented by the general formula (5A) to (5D):

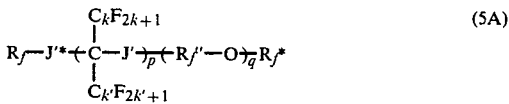  (5A)

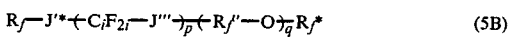  (5B)

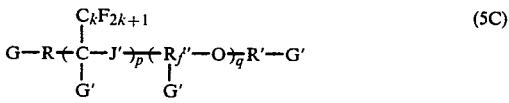  (5C)

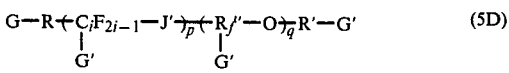  (5D)

wherein J' and J'* are as defined with respect to the general formulas (3A) and (3B), J''' represents almost the same as J', J'* except that J''' never represents —O—, $R_f$, Rf', Rf'', R, R', G and G' are as defined with respect to the general formulas (4A) and (4B), i is 0 or a positive integer when referring to G or G' and i is a positive integer in all other cases, k is a positive integer, k' is 0 or an integer, p is a positive integer, q is 0 or a positive integer. In the general formulas (5C) and (5D) it suffices that at least one of Gs and G's exists.

Furthermore, the fifth group includes two-dimensionally cross-linked perfluoroalkyl polymers represented by the general formulas (5E) and (5F):

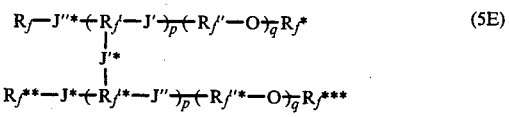  (5E)

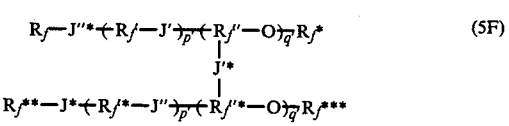  (5F)

wherein J'''*, J* and J'' each represent the same as J' and J'* in the general formulas (5A) to (5D), $R_f$ and $R_f*$ each represent the same as $R_f$, $R_f*$ in the general formulas (5A) to (5D), $R_f'*$ and $R_f''*$ each represent the same as $R_f'$, $R_f''$ in the general formulas (4A) and (4B), p' is 0 or an integer, q' is an integer, and the other symbols are as defined with respect to the general formulas (5A) to (5D). In these formulas (5E) and (5F), $R_f$ and/or $R_f'$ may include a functional group (G or G') as in the general formulas (4B). J* and J'''* may be omitted.

The polymers of the general formulas (5E) and (5F) may be modified to two-dimensionally cross-linked polymers formed by linking three or more linear structures with two or more bridging units.

The perfluoroalkyl compounds of the fifth group also strongly adhere to either the ferromagnetic material layer or the protective film.

In a magnetic storage medium according to the invention, the lubricant layer formed of one of the above described perfluoroalkyl compounds exhibits very good lubricating performance and excellent durability without being scratched during repeated rubbing contact with the read/write head. This is attributed to the strongly orientative and adhering properties of the employed perfluoralkyl compound. Besides, the same perfluoroalkyl compound has the effect of reducing cohesion between the head and the storage medium so that the storage medium does not stick to the head even when the lubricant layer is somewhat worn away by repeated CSS operations. Therefore, the reliability of the magnetic memory unit as a whole is greatly improved. This invention can be embodied in not only magnetic hard disks but also floppy disks, magnetic tapes and magnetic cards.

The viscosities of the above described perfluoroalkyl compounds can be varied over a wide range such as from 10 to $10^6$ centistokes by selecting the molecular chain length and the kind of the functional groups. If desired, a mixture of a perfluoroalkyl compound specified in this invention and a relatively small amount of a different kind of lubricating material may be used as the material of the lubricant layer according to the invention.

DESCRIPTION OF THE PREFERRED EMBODIMENTS

Figure 1:
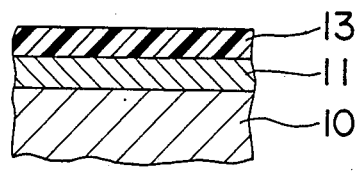
FIG. 1 shows a basic construction of a magnetic storage medium according to the invention in a fractional, sectional and explanatorily enlarged view.
Figure 2:
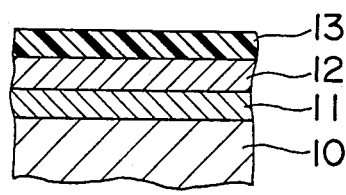
FIG. 2 shows a modified construction of a magnetic storage medium according to the invention in the same view as in FIG. 1.

Referring to FIG. 1, a magnetic storage medium according to the invention comprises a magnetic recording medium 11 as a coating on a mirror-finished surface of a base 10. The magnetic recording medium layer 11 is directly and completely coated with a lubricant layer 13 the material of which is perfluoroalkyl compound of the above described category or a mixture of such a perfluoroalkyl compound and a conventional lubricating material. This is a basic construction of a magnetic storage mediunm according to the invention. As shown in FIG. 2, according to the need the magnetic recording medium layer 11 may be coated with a protective film 12. In such a case the lubricant layer 13 according to the invention is formed as a coating on the protective film 12. The base 10 and the magnetic recording medium 11 do not differ from the counterparts in conventional magnetic storage media.

The material of the base 10 can be selected from a variety of metallic and nonmetallic materials. For example, the base material is a metal such as an aluminum alloy, which may be plated or otherwise coated with a hard metal such as Cr, Mo, W, Fe-Ni or Ni-P anodically oxidized aluminum, chromium, molybdenum, tungsten or ferronickel, plastics such as polyester, polyimide, polyamideimide, polysulfone or aromatic polyether, glass or ceramics. A typical form of the base 10 is a disk, but this is not limitative. There are alternative forms such as drum, tape and card.

Typical examples of ferromagnetic materials useful for the magnetic recording medium 11 are iron oxides such as $Fe_3O_4$ and $\gamma$-$Fe_2O_3$ and alloys such as Co-Ni, Co-Ni-P, Co-Mn-P, Co-Ni-Mn-P, Co-Re, Co-Mn-Re-P, Co-Cr, Co-V, Co-Pt, Co-Ni-Pt, Co-Pt-Cr, Co-Pt-V, Co-Rh, Co-Ni-Mo and Co-Sm. The magnetic recording medium layer 11 is formed by plating or by a physical vapor deposition method.

The protective film 12 is formed of a silicon compound such as $SiO_2$, $Si_3N_4$, SiC or polysilicic acid, a metal oxide such as NiO, CoO, $Co_3O_4$, $Co_2O_3$, $\alpha$-$Fe_2O_3$, $Cr_2O_3$, $CrO_3$, $TiO_2$ or $ZrO_2$, a metal nitride such as TiN, ZrN, CrN or TaN, a metal carbide such as TiC, ZrC, CrC or TaC or a metal usually selected from W, Cr, Ir, Ru, Rh, Mn, Mo, Os and Ta, including their alloys, and NiP. Any of these materials for the protective film 12 is good in affinity for the lubricating material according to the invention so that the lubricant layer 13 strongly adheres to the protective film 12. In this regard, nickel oxide, cobalt or silicon dioxide is particularly favorable.

When using a mixture of a perfluoroalkyl compound specified in the present invention and a conventional lubricating material for the lubricant layer 13, the latter lubricating material can be selected from a variety of organic substances such as perfluoroalkyl polyethers having the repeating unit

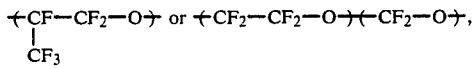

polytetrafluoroethylene, polytetrafluoroethylene telomers, perfluorocarboxylic acids, perfluoro alcohols, perfluorocarboxylic acid esters, fatty acid esters or perfluoro alcohols, perfluoroalkylalkoxysilanes, fluorosilicones, perfluoroalkylsulfonic acides, ammonium perfluoroalkylsulfonates, aliphatic alkylalkoxysilanes, higher fatty acids, higher aliphatic alcohols, higher fatty acid esters, higher fatty acid amides, fatty acid amines, unsaturated higher fatty acids, straight chain aliphatic hydrocarbons, polyalkylene glycols, silicone oils, polyoxyethylene, neopentyl polyol esters and polyphenyl ethers. In such a mixed lubricant the amount of a perfluoroalkyl compound specified by the invention should be at least 50 wt%, and preferably at least 80 wt%.

The lubricant layer 13 is formed by applying a solution of a selected perfluoroalkyl compound, together with a optional lubricant if used, in a suitable organic solvent onto the magnetic recording medium layer 11 in FIG. 1 or onto the protective film 12 in FIG. 2 and drying the liquid coating until complete removal of the solvent. Optionally the lubricant layer 13 thus formed may be baked at 100°-300° C.

The invention will further be illustrated by the following nonlimitative examples.

EXAMPLE 1

An aluminum alloy disk plated with Ni-P was used as the base 10. The Ni-P plating surface was mirror-finished to a surface roughness of 0.02 $\mu$m, and a Co-Ni-P alloy was plated on that surface to provide a magnetic recording medium layer 11 having a thickness of 0.05 $\mu$m. A protective film 12 was formed by coating the magnetic alloy layer 11 with a polysilicic acid of the class as shown in Japanese patent application provisional publication No. 52-20804 (1977) by using a spin-coating method.

In this example the material of the lubricant layer 13 was a perfluoroalkyl compound represented by the following formula.

This compound was dissolved in trifluorotrichloroethane (hereinafter referred to as Freon) to obtain 0.1 wt% solution, and the solution was spin-coated onto the protective film 12.

The thus produced magnetic disk was subjected to a sort of abrasion test for evaluation of durability of the lubricant layer 13, and proved to be excellent in durability. In the test the sample magnetic disk was set in a magnetic disk memory unit having a head slider in which a core made of $Al_2O_3$·TiC was under a load of 15 g, and contact-start-stop (CSS) operations were repeated a number of times until the disk was scratched or otherwise damaged. Also measued was a critical film thickness of the lubricant at which the head began to stick to the disk. The magnetic disks produced in the following examples were also subjected to the same test. The test results are collectively shown in tables placed hereinafter.

EXAMPLE 2

The process of Example 1 was repeated except that n in the formula of the perfluoroalkyl compound was between 20 and 30 in this case and that the perfluoroalkyl compound was dissolved in Freon so as to obtain 0.05 wt% solution.

EXAMPLE 3

The process of Example 1 was repeated except that a perfluoroalkyl compound having functional groups at both terminals as represented by the following formula was used.

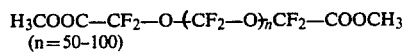

EXAMPLES 4-13

In these examples the process of Example 1 was repeated except that the following perfluoroalkyl compounds were used, respectively, in place of the perfluoroalkyl compound in Example 1.

EXAMPLE 4

EXAMPLE 5

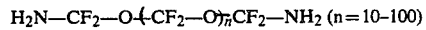

EXAMPLE 6

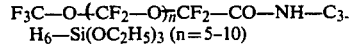

EXAMPLE 7

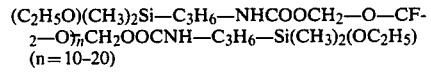

EXAMPLE 8

HOCH$_2$—CF$_2$—O—CF$_2$—O)$_n$CF$_2$—CH$_2$—OH
(n=20-50)

EXAMPLE 9

OCN—CF$_2$—O—CF$_2$—OO$_n$CF$_2$—NCO
(n=30-100)

EXAMPLE 10

$$H_2C\underset{O}{\overset{}{\diagdown\diagup}}CH-CH_2-(CF_2-O)_n CH_2-CH\underset{O}{\overset{}{\diagdown\diagup}}CH_2$$
(n = 90-120)

EXAMPLE 11

NC-(CF$_2$—O)$_n$CN (n=30-100)

EXAMPLE 12

H$_2$NOC-(CF$_2$—O)$_n$CONH$_2$ (n=20-50)

EXAMPLE 13

HO$_3$S(CH$_2$)$_3$—OCH$_2$-(CH$_2$—O)$_n$CH$_2$O—(CH$_2$)$_3$SO$_3$H (n=10-20)

EXAMPLE 14

The process of Example 1 was repeated except that the protective film 12 was formed by the steps of plating the magnetic alloy layer 11 with Ni-P to a thickness of 500 Å and then baking at 280° C. to thereby produce a NiO surface.

EXAMPLE 15

The process of Example 1 was repeated except that the protective film 12 was formed by depositing SiO$_2$ on the magnetic alloy layer 11 to a thickness of 200 Å by sputtering and that the perfluoroalkyl compound of Example 3 was used.

EXAMPLE 16

The process of Example 1 was repeated except that the magnetic recording medium layer 11 was formed by sputtering of a Co-Cr alloy, that coating of the magnetic alloy layer with the protective film 12 was omitted and that the perfluoroalkyl compound of Example 3 was used for the lubricant layer 13.

EXAMPLE 17

Example 16 was modified only in that the magnetic recording medium layer 11 was formed by sputtering of γ-Fe$_2$O$_3$.

EXAMPLE 18-21

In these examples the process of Example 1 was repeated except that the following perfluoroalkyl compounds were used, respectively, in place of the perfluoroalkyl compound in Example 1.

EXAMPLE 18

F$_3$C—C(=O)—O-(CF$_2$—C(=O)—O)$_n$CF$_3$ (n = 10-20)

EXAMPLE 19

F$_3$C—C(=O)—NH—C-(CF$_2$—NH—C(=O))$_n$OCH$_3$ (n = 5-10)

EXAMPLE 20

F$_5$C$_2$—C(=O)-(CF$_2$—O)$_n$CF$_3$ (n = 15-30)

EXAMPLE 21

F$_3$C—NH—C(=O)—O-(CF$_2$—NH—C(=O)—O)$_n$CF$_3$ (n = 2-5)

REFERENCE 1

The process of Example 1 was repeated except that a perfluoroalkyl polyether represented by the following formula was used for the lubricant layer 13 in place of the perfluoroalkyl compound of Example 1.

F$_5$C$_2$-(CF(CF$_3$)—CF$_2$—O)$_n$C$_2$H$_5$ (n = 30-50)

REFERENCE 2

The process of Example 1 was repeated except that a perfluoroalkyl polyether represented by the following formula was used for the lubricant layer 13 in place of the perfluoroalkyl compound in Example 1.

F$_3$C-(C$_2$F$_4$—O)$_m$(CF$_2$—O)$_n$CF$_3$ (m=n=20-30)

Table 1 shows the results of the evaluation test on the magnetic disks produced in Example 1-21 and in References 1 and 2.

TABLE 1

| Sample Disk | Number of Times of CSS Operations until Appearance of Scratch | Critical Thickness of Film (Å) |
| --- | --- | --- |
| Ex. 1 | 50000 | 80 |
| Ex. 2 | 60000 | 50 |
| Ex. 3 | 100000 | 100 |
| Ex. 4 | 80000 | 120 |
| Ex. 5 | 120000 | 100 |
| Ex. 6 | 100000 | 90 |
| Ex. 7 | 150000 | 150 |
| Ex. 8 | 130000 | 120 |
| Ex. 9 | 110000 | 110 |
| Ex. 10 | 120000 | 100 |
| Ex. 11 | 90000 | 90 |
| Ex. 12 | 110000 | 130 |
| Ex. 13 | 100000 | 150 |
| Ex. 14 | 60000 | 80 |
| Ex. 15 | 40000 | 80 |
| Ex. 16 | 10000 | 120 |
| Ex. 17 | 20000 | 90 |
| Ex. 18 | 80000 | 90 |
| Ex. 19 | 70000 | 70 |

TABLE 1-continued

| Sample Disk | Number of Times of CSS Operations until Appearance of Scratch | Critical Thickness of Film (Å) |
|---|---|---|
| Ex. 20 | 90000 | 80 |
| Ex. 21 | 60000 | 90 |
| Ref. 1 | 2000 | 5 |
| Ref. 2 | 4000 | 10 |

From the test results shown in Table 1 it is apparent that the perfluoroalkyl compounds used in the examples produce remarkable improvements in the durability of the magnetic disk by comparison with the perfluoroalkyl polyethers of References 1 and 2. Also it is understood that the perfluoroalkyl compounds used in Examples 3-13, which had at least one terminal functional group, provide particularly high durabilities. In the cases of Examples 16 and 17 the durability was worse than in other examples by reason of omission of the protective film between the magnetizable layer and the lubricant layer, but even in these cases the durability was better than in the cases of References 1 and 2. As to the critical thickness of film concerning the sticking of the head to the disk, it can be seen that when any of the perfluoroalkyl compounds of the examples was used the sticking of the head did not take place until the film thickness reached at least 50 Å whereas in the cases of References 1 and 2 the sticking began while the film thickness was far smaller. In the cases of Examples 3-13 using the perfluoroalkyl compounds having at least one terminal functional group, the critical thickness of film further increased to 90-150 Å or, in other words, the likelihood of the sticking of the head was further reduced.

EXAMPLE 22

To produce a magnetic disk according to the invention, the process of Example 1 was repeated except that a perfluoroalkyl compound of the following formula was used for the lubricant layer 13 in place of the perfluoroalkyl compound in Example 1.

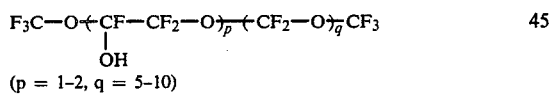

(p = 1-2, q = 5-10)

EXAMPLE 23

Example 22 was modified only in that in the formula of the perfluoroalkyl compound p=5-8 and q=10-20 in this case and that the perfluoroalkyl compound was dissolved in Freon so as to obtain 0.05 wt% solution.

EXAMPLES 24-33

In these examples the process of Example 1 was repeated except that the following perfluoroalkyl compounds were used, respectively, in place of the perfluoroalkyl compound in Example 1.

EXAMPLE 24

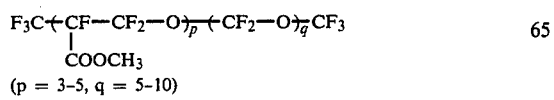

(p = 3-5, q = 5-10)

EXAMPLE 25

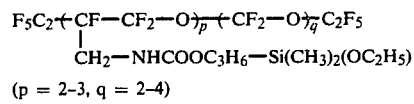

(p = 2-3, q = 2-4)

EXAMPLE 26

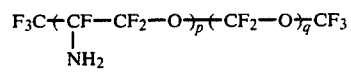

(p = 5-6, q = 5-10)

EXAMPLE 27

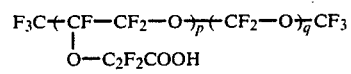

(p = 2-3, q = 20-30)

EXAMPLE 28

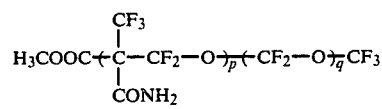

(p = 1-3, q = 5-10)

EXAMPLE 29

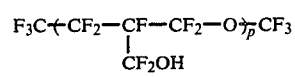

(p = 5-7)

EXAMPLE 30

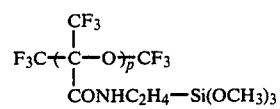

(p = 3-5)

EXAMPLE 31

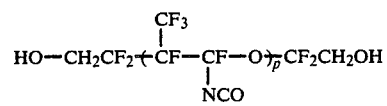

(p = 5-10)

EXAMPLE 32

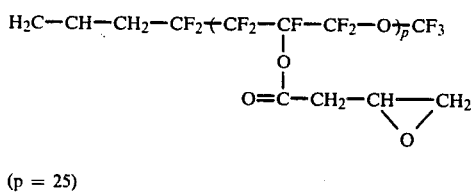

(p = 25)

EXAMPLE 33

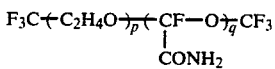

(p = 30–40, q = 2–5)

EXAMPLE 34

The process of Example 1 was repeated except that the protective film 12 was formed by the steps of plating the magnetic alloy layer 11 with Ni-P to a thickness of 500 Å and then baking at 280° C. to thereby produce a NiO surface and that the perfluoroalkyl compound of Example 22 was used.

EXAMPLE 35

The process of Example 1 was repeated except that the protective film 12 was formed by depositing $SiO_2$ on the magnetic alloy layer 11 to a thickness of 200 Å by sputtering and that the perfluoroalkyl compound of Example 24 was used.

EXAMPLE 36

The process of Example 1 was repeated except that the magnetic recording medium layer 11 was formed by sputtering of a Co-Cr alloy, that coating of the magnetic alloy layer with the protective film 12 was omitted and that the perfluoroalkyl compound of Example 24 was used.

EXAMPLE 37

Example 36 was modified only in that the magnetic recording medium layer 11 was formed by sputtering $\gamma$-$Fe_2O_3$.

EXAMPLE 38

To the perfluoroalkyl compound of Example 22, 1 wt% of another lubricant represented by the following formula was added. The resultant mixture was used as the material of the lubricant layer 13. Otherwise the process of Example 1 was repeated.

EXAMPLES 39–41

In these examples the process of Example 1 was repeated except that the following perfluoroalkyl compounds were used, respectively, in place of the perfluoroalkyl compound in Example 1.

EXAMPLE 39

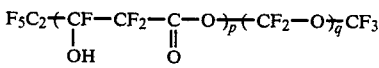

(p = 1–2, q = 5–10)

EXAMPLE 40

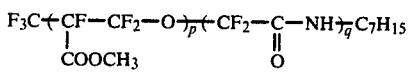

(p = 3–5, q = 3–5)

EXAMPLE 41

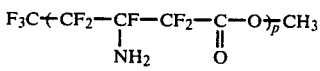

(p = 10)

Table 2 shows the results of the evaluation test described hereinbefore on the magnetic disks produced in Examples 22–41. Table 2 also contains the data obtained on the disks of References 1 and 2.

TABLE 2

| Sample Disk | Number of Times of CSS Operations until Appearance of Scratch | Critical Thickness of Film (Å) |
|---|---|---|
| Ex. 22 | 50000 | 80 |
| Ex. 23 | 60000 | 50 |
| Ex. 24 | 100000 | 100 |
| Ex. 25 | 80000 | 120 |
| Ex. 26 | 120000 | 100 |
| Ex. 27 | 100000 | 90 |
| Ex. 28 | 150000 | 150 |
| Ex. 29 | 130000 | 120 |
| Ex. 30 | 110000 | 110 |
| Ex. 31 | 120000 | 100 |
| Ex. 32 | 90000 | 90 |
| Ex. 33 | 110000 | 130 |
| Ex. 34 | 100000 | 150 |
| Ex. 35 | 60000 | 80 |
| Ex. 36 | 40000 | 80 |
| Ex. 37 | 10000 | 120 |
| Ex. 38 | 100000 | 100 |
| Ex. 39 | 90000 | 110 |
| Ex. 40 | 110000 | 90 |
| Ex. 41 | 100000 | 110 |
| Ref. 1 | 2000 | 5 |
| Ref. 2 | 4000 | 10 |

Thus, the perfluoroalkyl compounds of Examples 22–41 too proved to provide lubricating coatings excellent in durability. The relatively inferior durabilities of the disks of Examples 36 and 37 were attributed to the omission of the protective film on the magnetizable layer. Furthermore, when these perfluoroalkyl compounds were used sticking of the head to the disk did not take place until the film thickness reached 50–150 Å. Such large values of the critical thickness of film are indicative of an ample margin in smooth and reliable operation of a disk memory unit.

EXAMPLES 42–54

In these examples the magnetic disk producing process of Example 1 was repeated except that the following perfluoroalkyl compounds were used, respectively, in place of the perfluoroalkyl compound in Example 1.

EXAMPLE 42

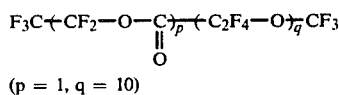

(p = 1, q = 10)

EXAMPLE 43

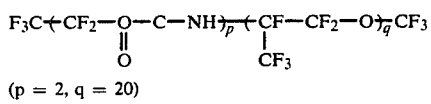

(p = 2, q = 20)

EXAMPLE 44

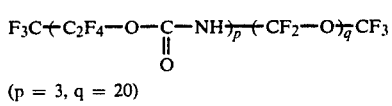

(p = 3, q = 20)

EXAMPLE 45

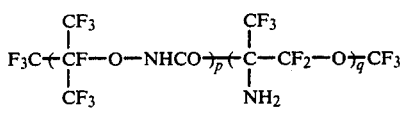

(p = 5, q = 5)

EXAMPLE 46

$F_3C$—$(CF_2$—$S)_p(C_2F_4$—$O)_qCF_3$ (p=2, q=10)

EXAMPLE 47

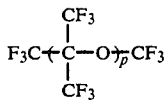

(p = 50)

EXAMPLE 48

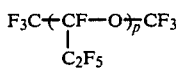

(p = 30)

EXAMPLE 49

$F_3C$—$(C_3F_3$—$O)_pCF_3$ (p=20)

EXAMPLE 50

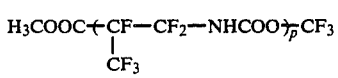

(p = 15)

EXAMPLE 51

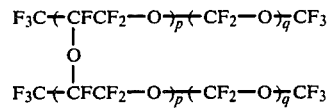

(p = 2, q = 10)

EXAMPLE 52

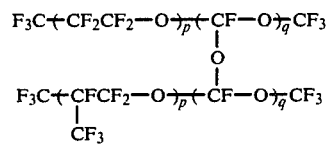

(p = 10, q = 3)

EXAMPLE 53

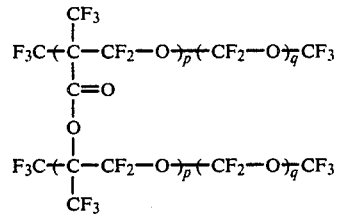

(p = 1, q = 30)

EXAMPLE 54

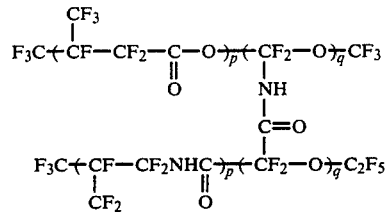

(p = 20, l = 2)

EXAMPLE 55

The process of Example 1 was repeated except that the protective film 12 was formed by the steps of plating the magnetic alloy layer 11 with Ni-P to a thickness of 500 Å and then baking at 280° C. to thereby produce a NiO surface and that the perfluoroalkyl compound of Example 42 was used.

EXAMPLE 56

The process of Example 1 was repeated except that the protective film 12 was formed by depositing $SiO_2$ on the magnetic alloy layer 11 to a thickness of 200 Å by sputtering and that the perfluoroalkyl compound of Example 44 was used.

EXAMPLE 57

The process of Example 1 was repeated except that the magnetic recording medium layer 11 was formed by sputtering of Co-Cr alloy, that coating of the magnetic alloy layer with the protective film 12 was omitted and that the perfluoroalkyl compound of Example 50 was used.

EXAMPLE 58

Example 57 was omitted only in that the magnetic recording medium layer was formed by sputtering of γ-Fe₂O₃.

EXAMPLES 59 AND 60

In these examples the process of Example 1 was repeated except that the following perfluoroalkyl compounds were used, respectively, in place of the perfluoroalkyl compound in Example 1.

EXAMPLE 59

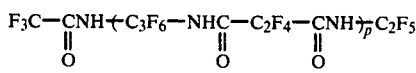

(p = 10)

EXAMPLE 60

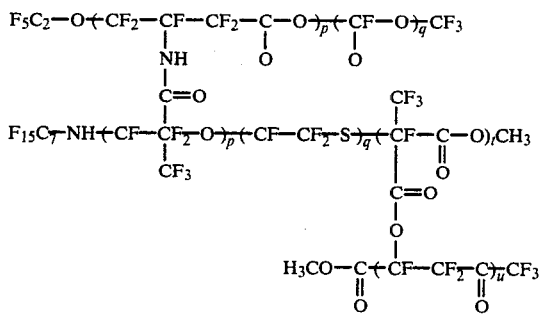

(p = 1, q = 1, t = 1, u = 1)

Table 3 shows the results of the evaluation test described hereinbefore on the magnetic disks produced in Examples 42–60. Table 3 also contains the data obtained on the disks of References 1 and 2.

TABLE 3

| Sample Disk | Number of Times of CSS Operations until Appearance of Scratch | Critical Thickness of Film (Å) |
|---|---|---|
| Ex. 42 | 50000 | 80 |
| Ex. 43 | 60000 | 50 |
| Ex. 44 | 100000 | 100 |
| Ex. 45 | 80000 | 120 |
| Ex. 46 | 120000 | 100 |
| Ex. 47 | 100000 | 90 |
| Ex. 48 | 150000 | 150 |
| Ex. 49 | 130000 | 120 |
| Ex. 50 | 110000 | 110 |
| Ex. 51 | 120000 | 100 |
| Ex. 52 | 90000 | 90 |
| Ex. 53 | 110000 | 130 |
| Ex. 54 | 100000 | 150 |
| Ex. 55 | 60000 | 80 |
| Ex. 56 | 40000 | 80 |
| Ex. 57 | 10000 | 120 |
| Ex. 58 | 20000 | 90 |
| Ex. 59 | 80000 | 90 |
| Ex. 60 | 120000 | 60 |
| Ref. 1 | 2000 | 5 |
| Ref. 2 | 4000 | 10 |

As can be seen, the perfluoroalkyl compounds of Examples 42–60 too provide lubricating coatings excellent in durability. The relatively inferior durabilities of the disks of Examples 57 and 58 were attributed to the omission of the protective film. Furthermore, when these perfluoroalkyl compounds were used sticking of the head to the disk did not take place until the film thickness reached 50–150 Å.

What is claimed is:

1. A magnetic storage medium, comprising a layer of a ferromagnetic material coated on a base and a lubricant layer formed on the outer side of the ferromagnetic material layer, said lubricant layer comprises a perfluoroalkyl compound represented by the general formula (1):

wherein $R_f$ represents $C_mF_{2m+1}$ (m is a positive integer), n is a positive integer not smaller than 5, J and J' each represent

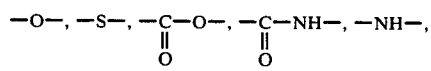

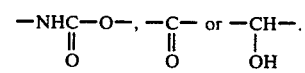

2. A magnetic storage medium according to claim 1, wherein said lubricant layer is laid directly on the surface of said ferromagnetic material layer.

3. A magnetic storage medium according to claim 1, further comprising a protective film coated directly on the surface of said ferromagnetic material layer, said lubricant layer is laid directly on the surface of said protective film.

4. A magnetic storage medium according to claim 1, wherein said base is a disk.

5. A magnetic storage medium, comprising a layer of a ferromagnetic material coated on a base and a lubricant layer formed on the outer side of the ferromagnetic material layer, said lubricant layer comprising a perfluoroalkyl compound represented by one of the general formula (2A), (2B) and (2C):

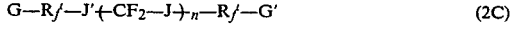

wherein $R_f$ represents $C_mF_{2m+1}$ (m is a positive integer), $R_f'$ represents $C_mF_{2m}$ (m is a positive integer), n is a positive integer not smaller than 10, J and J' each represent

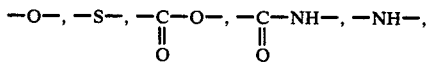

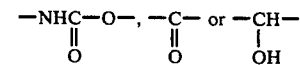

wherein J is not —S—, G and G' each represent a functional group selected from the group consisting of —NCO, —SH, —SO₃H, —SO₃M (M represents Na, K or Li), —CN, —NCS, —NO₂,

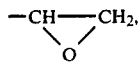

—CONH, —I, —COOH, —COOC$_j$H$_{2j+1}$ (j is a positive integer), —C$_i$H$_{2i}$OH (i is 0 or a positive integer), —NH$_2$, —CH=CH$_2$, —Si(C$_h$H$_{2h+1}$)$_g$X$_{3-g}$ (h is a positive integer, g is 0, 1 and 2, X represents Cl, —OH, —OC$_f$H$_{2f+1}$ (f is a positive integer) or —A—Si(C$_h$H$_{2h+1}$)$_g$X$_{3-g}$ (h, g and X are as defined above, A represent a radial consisting of at least one element selected from C, H, N, O and S).

6. A magnetic storage medium according to claim 5, wherein said lubricant layer is laid directly on the surface of said ferromagnetic material layer.

7. A magnetic storage medium according to claim 5, further comprising a protective film coated directly on the surface of said ferromagnetic material layer, said lubricant layer is laid directly on the surface of said protective film.

8. A magnetic storage medium according to claim 5, wherein said radial represented by A is selected from the group consisting of —CO—NH—CH$_2$—CH$_2$—, —NH—CH$_2$—CH(OH)—CH$_2$—CH$_2$—, —NH—CO—CH$_2$—, —O—CH$_2$—CH—, —S—CH$_2$—CH$_2$—,

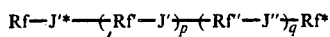

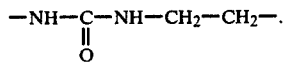

9. A magnetic storage medium according to claim 5, wherein said base is a disk.

10. A magnetic storage medium, comprising a layer of a ferromagnetic material coated on a base and a lubricant layer formed on the outer side of the ferromagnetic material layer, said lubricant layer comprising a perfluoroalkyl compound represented by one of the general formulas (3A), (3B), and (3C):

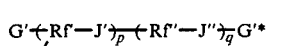 (3A)

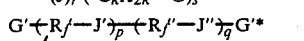

 (3B)

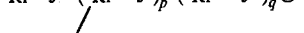 (3C)

wherein R$_f$ and R$_f$* each represent C$_m$F$_{2m+1}$ (m is a positive integer), R$_f'$ represents a radical consisting of carbon and fluorine atoms, R$_f''$ represents —C$_m$F$_{2m}$— (m is a positive integer), X represent H, F, Cl or Br, J, J', J'' and J'* each represents one of

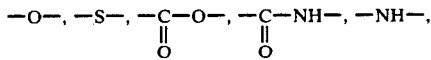

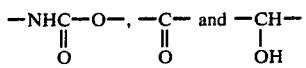

or a combination of two or more thereof, G, G' and G'* each represent a functional group selected from —NCO, —SH, —SO$_3$H, —SO$_3$M (M represents Na, K or Li), —CN, —NCS, —NO$_2$,

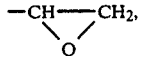

—CONH$_2$, —I, —COOH, —COOC$_j$H$_{2j+1}$ (j is a positive integer), —C$_i$H$_{2i}$OH (is is a positive integer), —NH$_2$, —CH$_2$=CH$_2$, —Si(C$_h$H$_{2h+1}$)$_g$X$_{3-g}$ (h is a positive integer, g is 0, 1 or 2, X represents Cl, —OH, —CO$_f$H$_{2f+1}$ (f is a positive integer) or —A—Si(C$_h$H$_{2h+1}$)$_g$X$_{3-g}$ (h, g and X are as defined above, A represents a radical consisting of at least one element selected from C, H, N, O and S), p is a positive integer, q is 0 or a positive integer, r is 0 or 1, k is 0 or a positive integer, s is a positive integer.

11. A magnetic storage medium according to claim 10, wherein said lubricant layer is laid directly on the surface of said ferromagnetic material layer.

12. A magnetic storage medium according to claim 10, further comprising a protective film coated directly on the surface of said ferromagnetic material layer, said lubricant layer is laid directly on the surface of said protective film.

13. A magnetic storage medium according to claim 10, wherein said radical represented by A is selected from the group consisting of —CO—NH—CH$_2$—CH$_2$—, —NH—CH$_2$—CH(OH)—CH$_{12}$—CH$_2$—, —NH—CO—CH$_2$—, —O—CH$_2$—CH$_2$—, —S—CH$_2$—CH$_2$—,

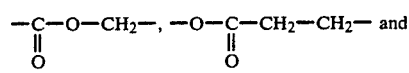

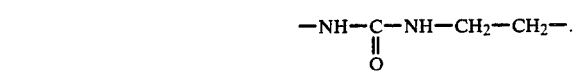

14. A magnetic storage medium according to claim 10, wherein R$_f'$ represents

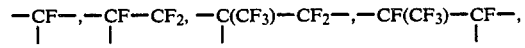

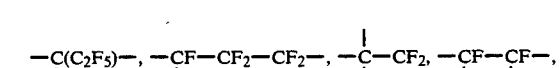

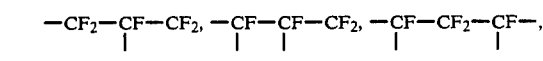

-continued

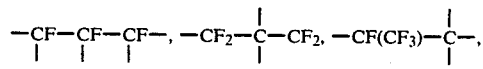

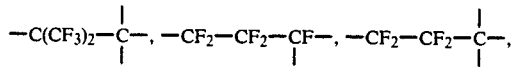

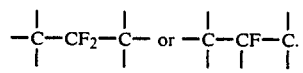

15. A magnetic storage medium according to claim 10, wherein $R_f''$ represents

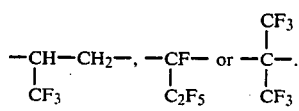

16. A magnetic storage medium according to claim 10, wherein said base is a disk.

17. A magnetic storage medium, comprising a layer of a ferromagnetic material coated on a base and a lubricant layer formed on the outer side of the ferromagnetic material layer, said lubricant layer comprising a perfluoroalkyl compound represented by one of the general formulas (4A) and (4B):

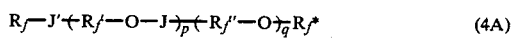 (4A)

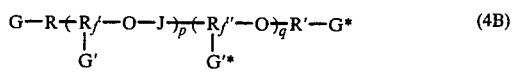 (4B)

wherein $R_f$ and $R_f{}^*$ each represent $C_mF_{2m+1}$ (m is a positive integer), $R_f'$ and $R_f''$ each represent a radical consisting of carbon and fluorine atoms, J and J' each represent one of —S—,

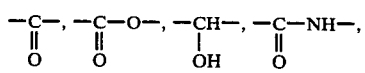

—NH—, —NH—CO—, —NHCO—NH— and —NH-COO— or a combination of two or more thereof wherein J is not —S—, G, G' and G* each represent a functional group selected from —NCO, —SH, —SO$_3$H, —SO$_3$M (M represents Na, K or Li), —CN, —NCS, —NO$_2$,

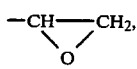

—CONH$_2$, —I, —COOH, —COOC$_j$H$_{2j+1}$ (j is a positive integer), —C$_i$H$_{2i}$OH (i is 0 or a positive integer), —NH$_2$, —CH=CH$_2$, 'Si(C$_h$H$_{2h+1}$)$_g$X$_{3-g}$ (h is a positive integer, g is 0, 1 or 2, X represents Cl, —OH, —OC$_f$H$_{2f+1}$ (f is a positive integer) or —A—Si(C$_h$H$_{2h+1}$)$_g$X$_{3-g}$ (h, g and X are as defined above), R and R' each represent C$_w$X$_{2w+2}$ (w is 0 or a positive integer, X represents H, F, Cl, Br or I), A represents a radical consisting of at least one element selected from C, H, N, O and S, p is a positive integer, g is 0 or a positive integer.

18. A magnetic storage medium according to claim 17, wherein said lubricant layer is laid directly on the surface of said ferromagnetic material layer.

19. A magnetic storage medium according to claim 17, further comprising a protective film coated directly on the surface of said ferromagnetic material layer, said lubricant layer being laid directly on the surface of said protective film.

20. A magnetic storage medium according to claim 17, wherein said radical represented by A is selected from the group consisting of —CO—NH—CH$_2$—CH$_2$—, —NH—CH$_2$—CH(OH)—CH$_2$—CH$_2$—, —NH—CO—CH$_2$, —O—CH$_2$—CH$_2$—, —S—CH$_2$—CH$_2$,

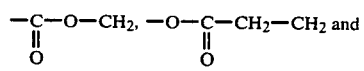

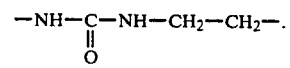

21. A magnetic storage medium according to claim 17, wherein $R_f'$ and $R_f''$ each represent

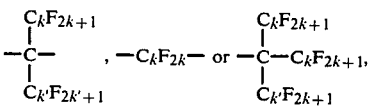

wherein k is an integer, k' is 0 or an integer.

22. A magnetic storage medium according to claim 17, wherein said base is a disk.

23. A magnetic medium comprising a layer of a ferromagnetic material coated on a base and a lubricant layer formed on the outer side of the ferromagnetic material layer, said lubricant layer comprising a perfluoroalkyl compound represented by one of the general formulas (5A), (5B), (5C), (5D), (5E) and (5F):

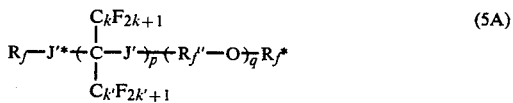 (5A)

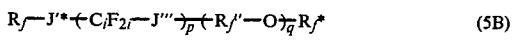 (5B)

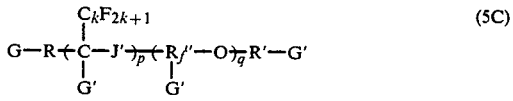 (5C)

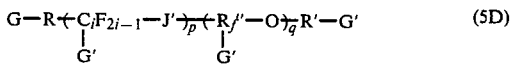 (5D)

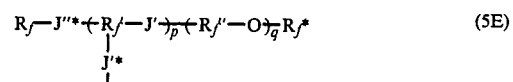 (5E)

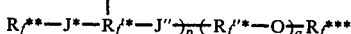

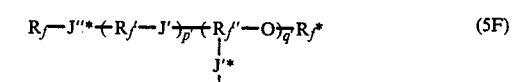 (5F)

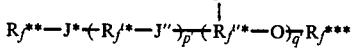

wherein $R_f$, $R_f{}^*$, $R_f{}^{}$ and $R_f{}^{*}$ each represent $C_mF_{2m+1}$ (m is a positive integer), $R_f'$, $R_f''$, $R_f'^*$ and $R_f''^*$ each represent a radical consisting of carbon and fluorine atoms, J', J'', J''', J'*, J''* and J* each represent one of —O—, —S—,

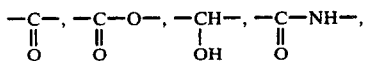

—NH—, —NH—CO—, —NHCO—NH— and —NH—COO— or a combination of two or more thereof on condition that J''' never represent —O—, R and R' each represents $C_wX_{2+2}$ (w is 0 or an integer, X represent H, F, Cl, Br or I), G and G' each represent a functional group selected from —NCO, —SH, —SO$_3$H, —SO$_3$M (M represents Na, K or Li), —CN, —NCS, —NO$_2$,

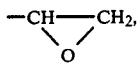

—CONH$_2$, —I, —COOH, —COOC$_j$H$_{2j+1}$ (j is a positive integer), —C$_i$H$_{2i}$OH, —NH$_2$, —CH=CH$_2$, Si(C$_h$H$_{2h+1}$)$_g$X$_{3-g}$ (h is a positive integer, g is 0, 1 or 2, X represents Cl, —OH, —OC$_f$H$_{2f+1}$ (f is a positive integer) or —A—Si(C$_h$H$_{2h+1}$)$_g$X$_{3-g}$ (h, g and X are as defined above, A represents a radical consisting of at least one element selected from C, H, N, O and S), p is a positive integer, q is 0 or a positive integer, k is a positive integer, k' is 0 or a positive integer, p' is 0 or a positive integer, q' is a positive integer and i is 0 or a positive integer when referring to G and G' and i is a positive integer in all other cases.

24. A magnetic storage medium according to claim 23, wherein said lubricant layer is laid directly on the surface of said ferromagnetic material layer.

25. A magnetic storage medium according to claim 23, further comprising a protective film on the surface of said ferromagnetic material layer, said lubricant layer being laid directly on the surface of said protective film.

26. A magnetic storage medium according to claim 23, wherein said radical represented by A is selected from the group consisting of —CO—NH—CH$_2$—CH$_2$—, —NH—CH$_2$—CH(OH)—CH$_2$—CH$_2$—, —NH—CO—CH$_2$—, —O—CH$_2$—CH$_2$—, —S—CH$_2$—CH$_2$—,

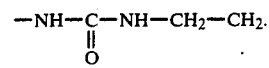

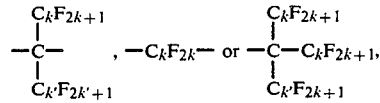

27. A magnetic storage medium according to claim 23, wherein R$_f'$ and R$_f''$ each represent $$-\underset{\underset{C_{k'}F_{2k'+1}}{|}}{\overset{C_kF_{2k+1}}{\underset{|}{C}}}- \;,\; -C_kF_{2k}- \;\text{or}\; -\underset{\underset{C_{k'}F_{2k+1}}{|}}{\overset{C_kF_{2k+1}}{\underset{|}{C}}}-C_kF_{2k+1},$$

wherein k is an integer, k' is 0 or an integer.

28. A magnetic storage medium according to claim 23, wherein said base is a disk.

* * * * *